Aug. 19, 1969

D. M. BROWN ET AL 3,461,591

UNDERWATER SAMPLING APPARATUS

Filed Nov. 3, 1967

INVENTOR
DANIEL M. BROWN
JOHN A. McGOWAN

BY *Rines and Rines*

ATTORNEYS

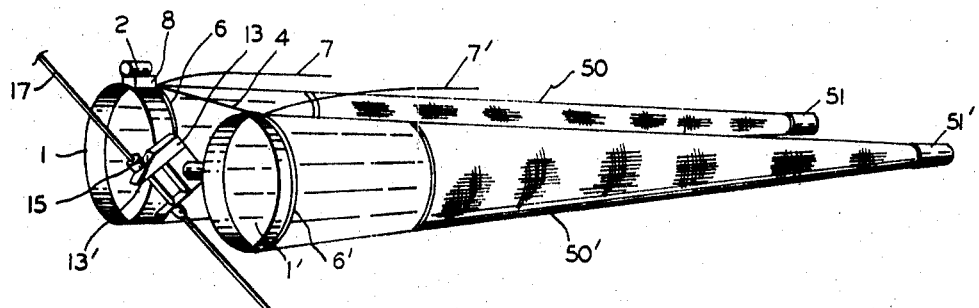
FIG.2
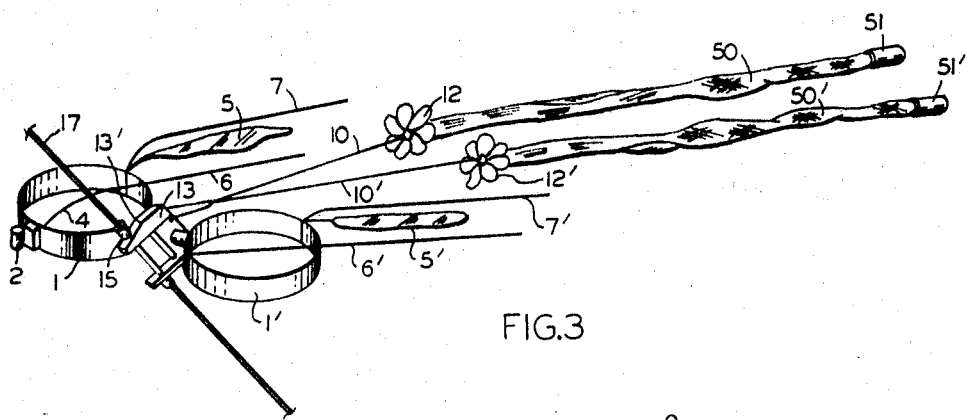
FIG.3
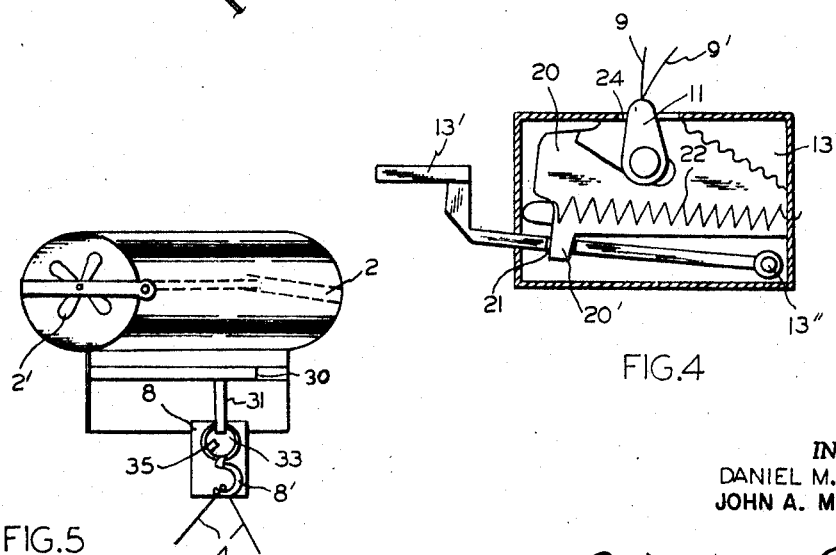
FIG.4
FIG.5
INVENTOR
DANIEL M. BROWN
JOHN A. McGOWAN
BY Rines and Rines
ATTORNEYS

United States Patent Office 3,461,591
Patented Aug. 19, 1969

3,461,591
UNDERWATER SAMPLING APPARATUS
Daniel M. Brown, La Jolla, and John A. McGowan, Del Mar, Calif.; said Brown assignor to the Regents of the University of California, Berkeley, Calif.
Filed Nov. 3, 1967, Ser. No. 680,542
Int. Cl. A01k 73/04, 73/06
U.S. Cl. 43—8                              8 Claims

ABSTRACT OF THE DISCLOSURE

Sampling nets adapted to be towed under water and to open and close at predetermined times under the control of release mechanisms and flow meter devices to obtain the desired samples of plankton and the like.

---

The present invention relates to underwater sampling apparatus being more particularly directed to nets adapted to be towed under water and automatically to be opened and closed at predetermined instants of time to collect desired samples of plankton and the like. The invention described herein was made in the course of a grant from the National Science Foundation.

While numerous types of sampling mechanisms have been evolved for the purpose of obtaining various specimens in the water, it has been difficult to control the volume of fluid flow that a sampling net receives and to limit such volume in a predetermined manner. An object of the present invention, accordingly, is to provide a new and improved underwater sampling apparatus that is adapted to be towed from a vessel, to open at a desired instant of time, and automatically to close and lock the sample within the net after a predetermined flow volume of water has passed through the net.

A further object is to provide a novel automatically operative sampling structure of more general utility, also.

In summary, the invention in its preferred form contemplates underwater sampling apparatus and the like having, in combination, net means open at one end and provided thereat with means for towing the same, cover means normally closing the said one end, messenger-responsive means for removing the cover means to open the said one end of the net means, flow-control means operable in response to the opening of the cover means to measure the volume flow past the net means, and means responsive to the reaching of a predetermined flow volume for thereupon closing off the said open end to trap the sample then within the net means. Constructional details are hereinafter presented.

The invention will now be described in connection with the accompanying drawings, FIG. 1 of which is an isometric view of a preferred embodiment, with cover means closing off the nets;

FIG. 2 is a similar view upon a reduced scale of the removing or opening of the cover means to permit the water to flow into the nets;

FIG. 3 is a similar view of the subsequent closing off of the nets to trap the samples therein;

FIG. 4 is a longitudinal section upon an enlarged scale of the trigger mechanism of FIGS. 1 and 2 for opening or removing the cover means; and FIG. 5 is a similar enlarged view of the details of a preferred mechanism controlled by the flow meter for initiating the closing-off of the nets.

Figure 1:
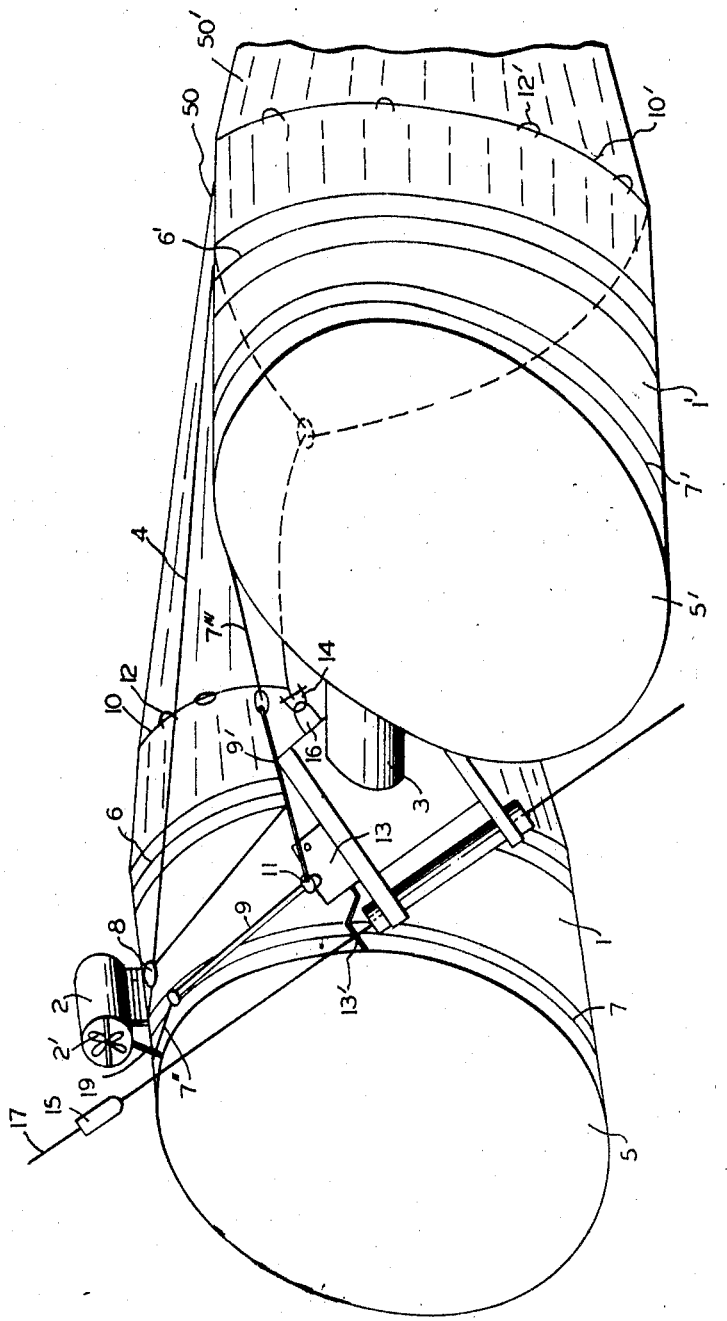

Referring to the drawing, the structure of the present invention embodies a pair of similar cylindrical hoops 1 and 1′ joined in side-by-side, slightly spaced relationship by a bar 3. Over the front of each hoop 1 and 1′ is detachably secured a fabric or other cover, as of nylon or the like, shown at 5 and 5′. This securing may be effected by steel or other cables 7 and 7′ extensions 7″ and 7‴ of which are connected with resilient cables 9 and 9′ that, in turn, terminate in a loop 11, normally held within a trigger-release mechanism 13, later discussed.

The mechanism 13, as hereinafter described in connection with FIG. 4, is rendered operative in response to the contacting action of a messenger cylinder 15 dropped along a towing cable 17 to release the loop 11 from the member 13. In view of the resilient nature of the sections 9–9′, this release of the loop 11 loosens the cover-binding provided by the steel cables 7–7′ and, in response to the pressure of the water as the structure is towed, collapses the covers 5–5′ inside the cylindrical hoops 1–1′, thus opening the same to the water.

This same release of the cable 7–7′, with the resulting opening or removing of the covers 5–5′, causes a pin 19 carried at the upper perimeter surface of the cover 5 to withdraw from a position blocking the propeller 2′ of a flow meter 2; this thus occurring after the hoops 1–1′ have been opened up to the flow of water, FIG. 2. In the embodiment of FIG. 2, the cables 7–7′ are shown released rearward and the hoops 1–1′ are shown open.

In accordance with the invention, the flow meter 2 is preset such that a predetermined number of revolutions of the propeller 2′, representing a certain volume flow through hoops 1–1′ and into the corresponding plankton nets 50–50′, the nets may become released from the hoops 1–1′ and close off to trap the plankton or other samples accumulated therein during the desired period of volume flow.

The nets 50–50′ are normally connected to the opposite ends of the hoops 1–1′ from the covers 5–5′ (shown to the right in FIG. 1) by means of binding cables 6–6′ that are connected with a tensioned cord 4. The cord 4, in turn, is connected with a release mechanism 8, the details of which are later described in connection with FIG. 5, which, when the flow meter 2 indicates a predetermined flow volume, releases the cord 4 and the cables 6–6′ and thus enables the nets 50–50′ to separate away from the hoops 1–1′, FIG. 3.

By providing choker cords 10–10′ about the terminal regions of the nets 50–50′ adjacent the hoops 1–1′, that pass through bales 12–12′ and connect to a shackle 14 coupled at 16 to the support for the trigger mechanism 13, the separation of the nets 50–50′ will automatically cause the choker cords 10–10′ to draw tight and close off the open ends of the nets 50–50′, thus to trap the desired samples.

In FIG. 3, the choke cords 10–10′ are shown trailing, following the drawing of the nets closed to trap the samples, with the covers 5–5′ similarly trailing rearward.

The details of a preferred trigger mechanism 13 are illustrated in FIG. 4 wherein a striker bar 13′ that is engaged by the messenger 15 normally holds a plate 20 in a locked position, with its projection 20′ received within an aperture 21 of the striker plate 13. When the messenger 15 strikes the striker bar 13′ it pivots it downwardly around the pivot 13″ releasing the plate 20, which is drawn horizontally rearwardly in response to the tension of a spring 22. This enables the loop 11 connected with the resilient cords 9–9′ to pull out of an aperture 24 in the release mechanism 13.

In FIG. 5 a more detailed showing of a preferred flow meter mechanism is shown, having a gear-reducing box 30 from which a control shaft 31 depends and controls a disc 33 having a slot 35. A release loop 8′ rides underneath the disc 33 and releases when the slot 35 becomes alined therewith, thus to release the tension cord 4. Such a flow-control mechanism 2 may, for example, be of the type marketed by TSK Company of Japan, or any other well-known type.

At the closed ends of the nets 50–50′ cod-end containers may be provided, as at 51–51′, which will contain the plankton or other collected matter and which may be readily detached from the nets themselves.

Further modifications will also occur to those skilled in the art and all such are considered to fall within the spirit and scope of the invention.

What is claimed is:

1. Underwater sampling apparatus and the like having, in combination, net means open at one end and provided thereat with means for towing the same, cover means normally closing the said one end, signal-responsive means for removing the cover means to open the said one end of the net means, flow control means operable in response to the opening of the cover means to measure the flow volume past the net means, and means responsive to the reaching of a predetermined flow volume as measured by the flow control means for thereupon closing off the said open end to trap the sample then within the net means.

2. Apparatus as claimed in claim 1 and in which the net means is provided at said one end with hoop means to one end of which it is detachably secured, and means controlled by the predetermined flow volume responsive means for effecting detachment from the hoop means.

3. Apparatus as claimed in claim 2 and in which the net means is further provided with means operable upon said detachment for thereupon closing off the detached end of the net means.

4. Apparatus as claimed in claim 3 and in which the last-named means comprises choke cord means for closing off said one end as it becomes detached.

5. Apparatus as claimed in claim 2 and in which said cover means is provided with means for detachably securing the same over the other end of the hoop means.

6. Apparatus as claimed in claim 5 and in which the cover securing means comprises cable means resiliently connected with release means, and said signal-responsive means comprises means for guiding messenger means to contact and release said release means.

7. Apparatus as claimed in claim 1 and in which said net means is provided at its other end with detactable recovery means.

8. Apparatus as claimed in claim 1 and in which said net means comprises a pair of side-by-side nets, said cover means comprises a pair of corresponding detachable covers, and said predetermined flow responsive means comprises a pair of corresponding closing-off means, the said signal-responsive means substantially simultaneously removing the pair of cover means, and the said predetermined-flow responsive means substantially simultaneously operating said closing-off means.

References Cited

UNITED STATES PATENTS

| | | | |
|---|---|---|---|
| 2,720,047 | 10/1955 | Isaacs | 43—7 |
| 2,721,411 | 10/1955 | Pedersen | 43—9 |
| 2,730,829 | 1/1956 | Burney | 43—8 |
| 2,767,501 | 10/1956 | Bjorksten | 43—7 |
| 2,771,702 | 11/1956 | Breidfjord | 43—9 |
| 3,310,984 | 3/1967 | Swanson | 43—4 X |

WARNER H. CAMP, Primary Examiner

U.S.Cl. X.R.

43—9